Patented Sept. 22, 1931

1,823,939

UNITED STATES PATENT OFFICE

WINFRID HENTRICH, OF WIESDORF-ON-THE-RHINE, AND RUDOLF KNOCHE, OF LEVER-KUSEN-ON-THE-RHINE, GERMANY, ASSIGNORS TO GENERAL ANILINE WORKS, INC., OF NEW YORK, N. Y., A CORPORATION OF DELAWARE

NEW MONOAZODYESTUFFS

No Drawing. Application filed May 7, 1929, Serial No. 361,254, and in Germany May 14, 1928.

The present invention relates to new mono-azo-dyestuffs, more particularly it relates to azo-dyestuffs of the probable general formula:

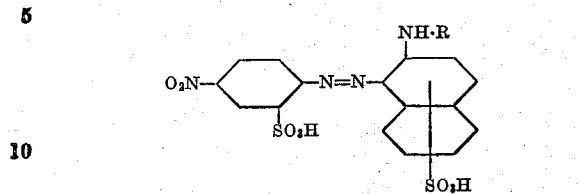

wherein R stands for an alkyl group, containing three to five carbon atoms.

The new monoazo-dyestuffs are obtainable by coupling in the usual manner in mineral acid solution diazotized 4-nitro-1-amino benzene-2-sulfonic acid with such a 2-alkyl amino-naphthalene-sulfonic acid of which the alkyl residue contains three to five carbon atoms.

Our new dyestuffs are in the dry pulverized form dark metallic lustrous powders, in the form of their alkali metal salts soluble in water with a violet to blue coloration. From an acid bath they dye wool even blue to violet shades of good fastness to washing, fulling and light. The dyeings on wool can be discharged whereby clear white effects are obtainable which are fast to light. On reduction with stannous chloride and hydrochloric acid the dyestuffs yield 1.4-diaminobenzene-2-sulfonic acid and 1-amino-2-alkyl-amino-naphthalene-sulfonic acid.

Our invention is illustrated by the following example, but is not restricted thereto, the parts being by weight:

*Example.*—235 parts of the ammonium salt of 4-nitro-1-amino-benzene-2-sulfonic acid are diazotized in the usual manner, coupled with 279 parts of 2-isobutylamino-naphthalene-7-sulfonic acid in a solution acid to Congo. When the coupling is complete after a short time, the dyestuff, having in the free state the following formula:

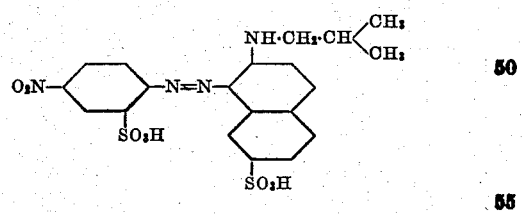

is transformed into its sodium salt by the addition of sodium carbonate, salted out, filtered and dried. The dyestuff dyes wool from an acid bath even bluish violet shades of good fastness to washing, fulling and light. The dyeings can be discharged and the discharge points are fast to light and water.

If in the above example the 2-iso-butyl-amino naphthalene-7-sulfonic acid is substituted by the 2-n-butylamino-naphthalene-7-sulfonic acid or by the 2-butylamino- or 2-amylamino-naphthalene-6-sulfonic acid, dyestuffs of similar properties, but dyeing a little more reddish shades are obtained.

We claim:

1. As new dyestuffs monoazo-dyestuffs of the probable general formula:

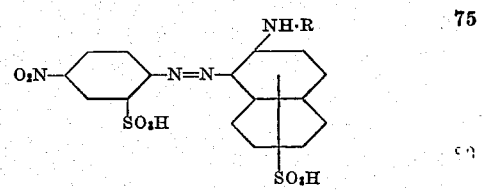

wherein R stands for an alkyl group containing three to five carbon atoms, being in the dry pulverized form dark metallic lustrous powders, in the form of their alkali metal salts soluble in water with a violet to blue coloration, dyeing wool from an acid bath even blue to violet shades of good fastness to washing, fulling and light.

2. As a new product the monoazo-dyestuff of the probable formula:

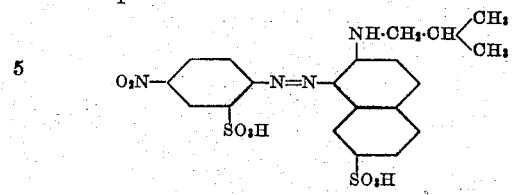

being in the dry pulverized form a dark metallic lustrous powder, in the form of its alkali metal salts soluble in water with a violet coloration, dyeing wool from an acid bath even bluish violet shades of good fastness to washing, fulling and light.

In testimony whereof we have hereunto set our hands.

WINFRID HENTRICH. [L. S.]
RUDOLF KNOCHE. [L. S.]